(12) United States Patent
Kim et al.

(10) Patent No.: US 6,320,851 B1
(45) Date of Patent: Nov. 20, 2001

(54) ASYMMETRIC CHANNEL ALLOCATION FOR A MOBILE STATION IN A CDMA COMMUNICATION NETWORK

(75) Inventors: Youngky Kim; Jaemin Ahn; Heewon Kang, all of Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 08/998,343

(22) Filed: Dec. 24, 1997

Related U.S. Application Data

(60) Provisional application No. 60/650,869, filed on Jun. 26, 1997.

(51) Int. Cl.[7] .................................................. H04B 7/216
(52) U.S. Cl. .......................... 370/320; 370/335; 370/320; 370/342; 370/441
(58) Field of Search .................................... 370/320, 335, 370/342, 441, 479, 468; 375/205; 455/422, 466

(56) References Cited

U.S. PATENT DOCUMENTS

| | | |
|---|---|---|
| 4,901,307 | 2/1990 | Gilhousen et al. . |
| 5,117,423 | 5/1992 | Shepherd et al. . |
| 5,377,192 | 12/1994 | Goodings et al. . |
| 5,521,906 | 5/1996 | Grube et al. . |
| 5,586,121 | 12/1996 | Moura et al. . |
| 5,950,124 | * 9/1999 | Trompower et al. ................ 455/422 |
| 6,069,883 | * 5/2000 | Ejzak et al. .......................... 370/335 |

OTHER PUBLICATIONS

"Code Division Multiple Access," *Communications*, Feb. 1990.

"CDMA EE465 Project," Website www.ee.mtu.edu/courses/ee465/groupe, Dec. 1997.

\* cited by examiner

*Primary Examiner*—Wellington Chin
*Assistant Examiner*—Brenda H. Pham
(74) *Attorney, Agent, or Firm*—John C. Han

(57) ABSTRACT

In a CDMA-based communication system, a system and method for allocating channel bandwidths and chip rates. The system and method supports asymmetric bandwidths and chip rates for the forward and reverse channels. The system and method includes a negotiation process between a mobile station and a base station to select chip rates and bandwidths for use in the forward and reverse channels.

32 Claims, 3 Drawing Sheets

ASYMMETRIC CHANNEL ALLOCATION FOR A MOBILE STATION IN A CDMA COMMUNICATION NETWORK

This application claims the benefit under Title 35 United States Code §119(e) of U.S. Provisional Application No. 60/050,869, filed Jun. 26, 1997.

FIELD OF THE INVENTION

The present invention generally relates to code division multiple access (CDMA) communication systems and, more particularly, to a system and method for allocating different bandwidth and chip rates to the forward and reverse channel links.

BACKGROUND OF THE INVENTION

One type of cellular communication system employs a technology known as CDMA (code division multiple access). In this system, users are distinguished from one another by unique codes assigned to them while sharing the same frequency band at the same time. CDMA converts information to be transmitted into a spread spectrum signal by multiplying the information by a pseudo random number (PN). This is what spreads the spectrum. The pseudo random number is a digital piece of data that, for all intents and purposes, appears to be entirely random. This PN is synchronized to the system in the CDMA mobile station by a pilot carrier sent from the base station. The rate at which the PN sequence is generated is known as the PN chip rate. For further description of CDMA and the differences between CDMA, TDMA (time division multiple access), and FDMA (frequency division multiple access), please see "Code Division Multiple Access," Communications, February 1990, by Fred Baumgartner, hereby incorporated by reference.

FIG. 1 graphically illustrates a CDMA-based communication system comprising a mobile station 10, a base station 20, reverse link 30 which represents the electromagnetic wave communication link transmitted from mobile station 10 to base station 20 and forward link 40 which represents the electromagnetic wave communication link transmitted from base station 20 to mobile station 10.

Current mobile stations used in wireless communications have symmetric forward and reverse channel bandwidths and corresponding symmetric chip rates. The term "symmetric" means that the bandwidths for the forward and reverse channels are the same and that the chip rates in the forward and reverse directions are the same. A CDMA standard, W-CDMA, has recently been proposed to accommodate high speed data (HSD) communication service over an air or wireless link. The HSD service may include various applications such as Internet access, electronic mail service, multimedia applications where more throughput is required for the forward channel than for the reverse channel, etc. Many of these services, such as multimedia applications, require asymmetric bandwidths for the forward and reverse directions. The term "asymmetric" means that the PN chip rates on the forward and reverse links are different from each other.

In present CDMA-based communication systems, all of the mobile stations have symmetric bandwidths for the forward and reverse links. The call setup procedure between a mobile station and a base station is accomplished over a symmetric forward and reverse link. After the call setup procedure is completed, a call is maintained on the same forward/reverse channel. FIG. 2 illustrates asymmetric channel allocation for the forward and reverse channels wherein $F_0$ (formed link channel frequency) does not equal $F_1$ (reverse link channel frequency) and $BW_0$ (forward link channel bandwidth) is equal to $BW_1$ (reverse link channel bandwidth). Both call setup and call maintenance are performed over the $F_0$, $F_1$ band.

What is needed are mobile stations that accommodate high speed data communication services by supporting asymmetric forward and reverse channel allocation.

SUMMARY OF THE INVENTION

Accordingly, the present invention provides a system and method for allocating asymmetric forward and reverse channels in a CDMA-based communication system. The present invention provides a system and method for allocating asymmetric bandwidths and chip rates to the forward and reverse channels. The present invention also provides a negotiation process between a mobile station and a base station for selecting an optimal bandwidth to be utilized by the mobile station for receiving transmitted information from a base station.

Further, the present invention provides a code division multiple access (CDMA) system comprising a base station operating to support a basic chip rate, a forward channel link chip rate, and a reverse channel link chip rate; and a mobile station in electronic communication with the base station, the mobile station communicating with the base station so as to independently adjust the values of the forward channel link chip rate and the reverse channel link chip rate. The forward channel link chip rate may be less than or equal to a maximum forward value allowed by the base station. The reverse channel link chip rate may be less than or equal to a maximum reverse value allowed by the base station. In addition, the forward channel link chip rate, the reverse channel link chip rate, and the basic chip rate may be equal to each other. The base station may transmit the maximum forward and/or reverse values to the mobile station. In addition, the forward channel link chip rate may be less than or equal to a maximum forward value allowed by the mobile station. Further, the reverse channel link chip rate may be less than or equal to a maximum reverse value allowed by the mobile station. In either case, the mobile station may transmit the maximum forward and/or reverse value to the base station.

The present invention also provides a method of operating a CDMA system comprising the steps of setting up a call to a base station operating to support a basic chip rate, a maximum forward channel link chip rate, and a maximum reverse channel link chip rate by paging the base station with a mobile station; requesting a desired forward channel link chip rate from the base station by the mobile station; transmitting the maximum forward channel link chip rate to the mobile station from the base station; transmitting a revised forward channel link chip rate to the base station from the mobile station; transmitting a start message to the mobile station from the base station; and communicating with the base station using the revised forward channel link chip rate. During the use of this method, the revised forward channel link chip rate may be equal to the basic chip rate. In addition, the revised forward channel link chip rate may be equal to the maximum forward channel link chip rate.

In addition, the method of operating a CDMA system may further comprise the steps of requesting a desired reverse channel link chip rate from the base station by the mobile station; transmitting the maximum reverse channel link chip rate to the mobile station from the base station; transmitting a revised reverse channel link chip rate to the base station from the mobile station; and communicating with the base station using the revised reverse channel link chip rate. In this case, the revised reverse channel link chip rate may be equal to the basic chip rate. Further, the maximum reverse channel link chip rate may be equal to the basic chip rate. The basic chip rate may also be equal to the revised forward channel link chip rate and the revised reverse channel link chip rate. The basic chip rate may also be equal to the maximum forward channel link chip rate and the maximum reverse channel link chip rate.

The present invention also provides a method of operating a CDMA system comprising the steps of setting up a call to a mobile station operating to support a basic chip rate, a maximum forward channel link chip rate, and a maximum reverse channel link chip rate by paging a mobile station with a base station; requesting a desired forward channel link chip rate from the mobile station by the base station; transmitting the maximum forward channel link chip rate to the base station from the mobile station; transmitting a revised froward channel link chip rate to the mobile station from the base station; transmitting a start message to the base station from the mobile station; and communicating with the mobile station using the revised forward channel link chip rate. The revised forward channel link chip rate may be equal to the basic chip rate, and/or may be equal to the maximum forward channel link chip rate. This method may further comprise the steps of requesting a desired reverse channel link chip rate from the mobile station by the base station from the mobile station; transmitting the maximum reverse channel link chip rate to the base station from the mobile station; transmitting a revised reverse channel link chip rate to the mobile station from the base station; and communicating with the mobile station using the revised reverse channel link chip rate. In this case, the basic chip rate may be equal to the revised reverse channel link chip rate, and/or the maximum reverse channel link chip rate. In addition, the basic chip rate may be equal to the revised forward channel link chip rate and the reverse channel link chip rate, and/or the maximum forward channel link chip rate and the maximum reverse channel link chip rate.

One advantage of the present invention is the increased flexibility provided for frequency allocation in a base station.

Another advantage of the present invention is the ability to accommodate asymmetric high speed data services, such as wireless multimedia applications.

The present invention also provides the advantage of increased efficiency of frequency usage.

DETAILED DESCRIPTION OF A PREFERRED EMBODIMENT OF THE INVENTION

Figure 1:
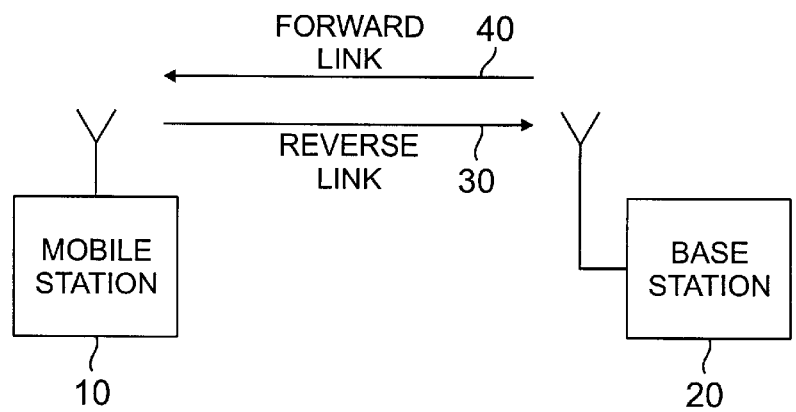
FIG. 1 is a prior art graphical representation of a CDMA-based communication system.
Figure 2:
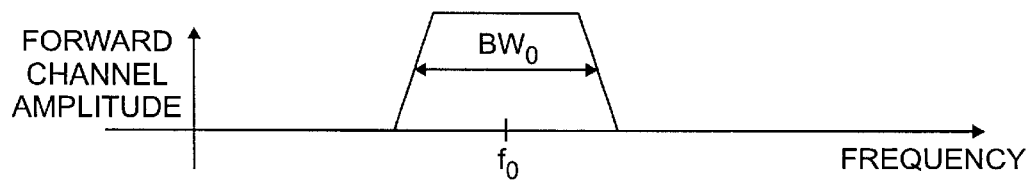
FIG. 2 is an amplitude-vs-frequency graph of the forward and reverse channels having symmetrical bandwidths.
Figure 2:
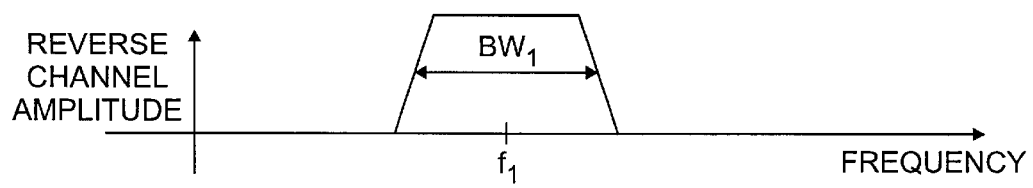
Figure 3:
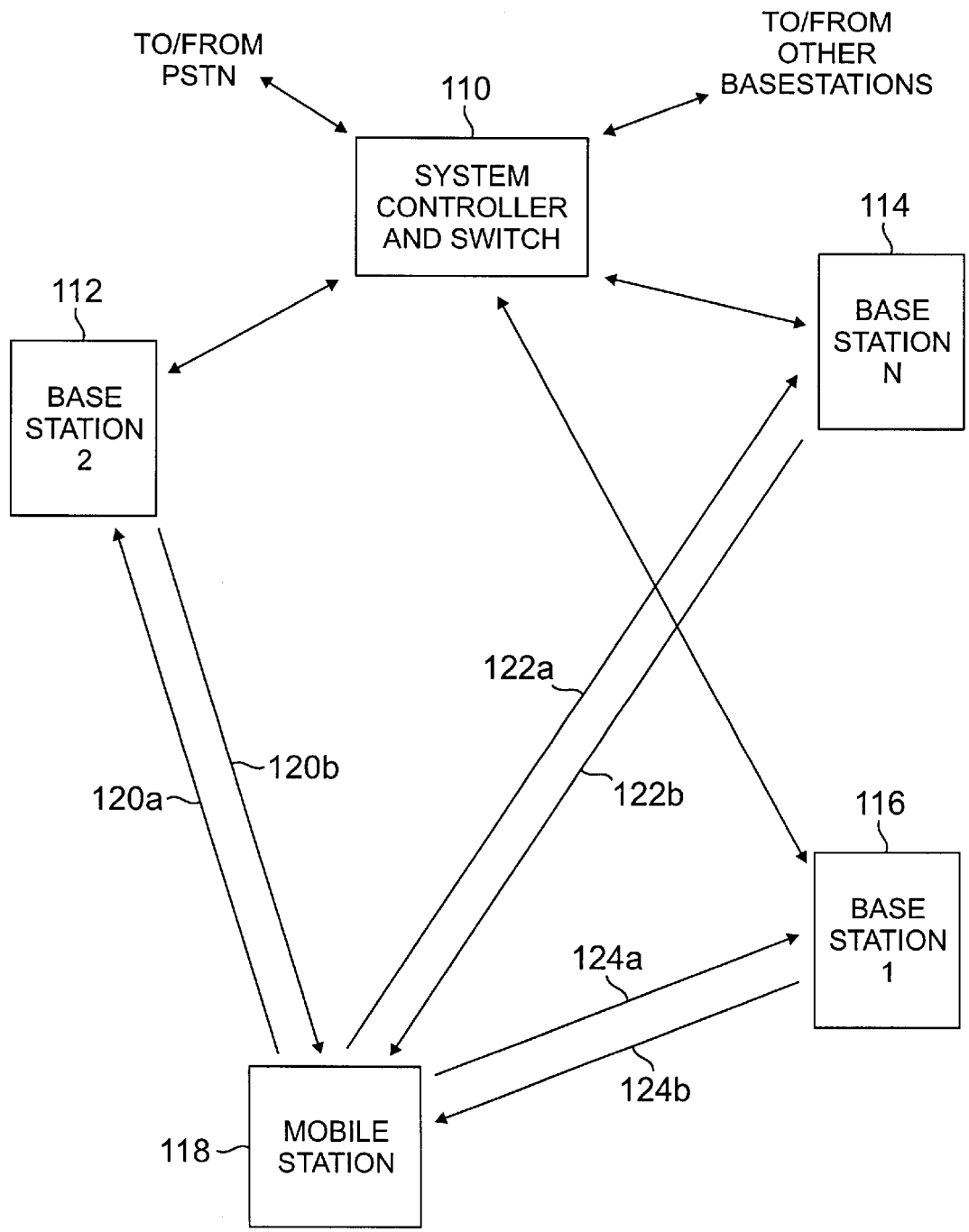
FIG. 3 is a schematic overview of an exemplary CDMA-based communication network in accordance with the present invention.

An exemplary telephone system in which the present invention is embodied is illustrated in FIG. 3. The system utilizes CDMA modulation techniques in communication between the system mobile stations, units or telephones, and the cell-sites or base stations. Cellular systems in large cities may have hundreds of cell-site stations serving hundreds of thousands of mobile telephones. The use of CDMA techniques readily facilitates increases in user capacity in systems of this size as compared to conventional FM modulation cellular systems.

In FIG. 3, system controller and switch 110, also referred to as mobile telephone switching office (MTSO), typically includes interface and processing circuitry for providing system control to the cell-sites or base stations. Controller 110 also controls the routing of telephone calls from the public switched telephone network (PSTN) to the appropriate base station for transmission to the appropriate mobile station. Controller 110 also controls the routing of calls from the mobile stations, via at least one base station to the PSTN. Controller 110 may direct calls between mobile users via the appropriate base stations, since such mobile stations do not typically communicate directly with one another.

Controller 110 may be coupled to the base stations by various means such as dedicated telephone lines, optical fiber links or by microwave communication links. It will be appreciated that system controller and switch 110 may be integrated with any number of base stations. In FIG. 3, three such exemplary base stations 112, 114, and 116 along with an exemplary mobile station 118, which includes a cellular telephone, are illustrated. Arrows 120a–120b define communication links between the base station 112 and the mobile station 118. Arrows 122a–122b define communication links between the base station 114 and the mobile station 118. Similarly, arrows 124a–124b define communication links between the base station 116 and the mobile station 118.

The cell-site or base station service areas, or cells, are designed in geographic shapes such that the mobile station will normally be closest to one cell-site. When the mobile station is idle, i.e., no calls in progress, the mobile station constantly monitors the pilot signal transmissions from each nearby base station. As illustrated in FIG. 3, the pilot signals are respectively transmitted to mobile station 118 by base stations 112, 114, and 116, respectively, upon forward communication links 120b, 122b, and 124b. The mobile station then determines which cell it is in by comparing pilot signal strength transmitted from these particular cell-sites.

In the example illustrated in FIG. 3, mobile station 118 may be considered closest to base station 116. When mobile station 118 initiates a call, a control message is transmitted to the nearest base station, base station 116. Base Station 116, upon receiving the call request message, signals system controller 110 and transfers the call number. System controller 110 then connects the call through the PSTN to the intended recipient.

According to the invention, mobile stations for high speed data service should support the asymmetric nature of that service. In other words, the mobile stations should support asymmetric forward and reverse link channels by adjusting the chip rates of the mobile station. The chip rates of the mobile station may be changed by varying the speed of the PN sequence generator. For further description of the mobile station components, please see the TIA/EIA/IS-95A Standard (herein incorporated by reference). The set of asymmetric forward and reverse channels of the present invention includes the use of symmetric forward and reverse channels as a special case. In order to comply with the W-CDMA standard, the bandwidth for the forward and reverse channels may have values equal to integer multiples of a basic bandwidth value. For example, the basic bandwidth of IS-95-based CDMA systems is typically 1.2288 MHZ. For operations such as the soft handoff procedure, mobile stations may utilize a basic forward/reverse channel combination having, for example, bandwidths equal to 1.2288 MHZ.

Figure 4:
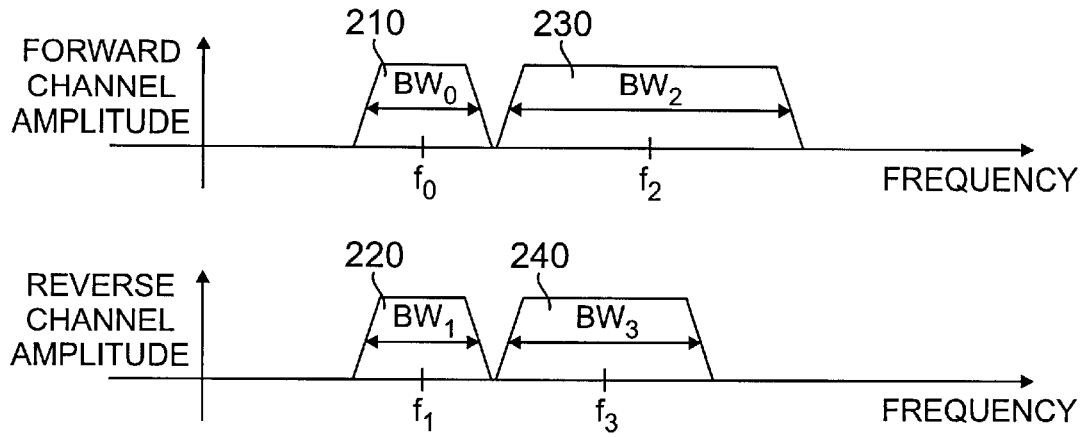
FIG. 4 is an amplitude-vs-frequency graph of the forward and reverse channel frequency allocations during and after the call setup procedure according to the present invention.

Referring now to FIG. 4 as an example of asymmetrical channel allocation, a graph of channel allocations according to the present invention is illustrated for both during and after the call setup procedure. The bandwidths of bands 210 (forward channel bandwidth—symmetric) and 220 (reverse channel bandwidth—symmetric) which are centered at frequencies $F_0$ (initial forward link channel frequency) and $F_1$ (initial reverse link channel frequency) are the same. The bandwidths of bands 230 (forward channel bandwidth—asymmetric) and 240 (reverse channel bandwidth—asymmetric), centered at frequencies $F_2$ (revised forward link channel frequency) and $F_3$ (revised reverse channel link frequency), may be different, that is, asymmetrical. The call setup procedure may be accomplished through bands 210 and 220 to negotiate the forward/reverse link channel bandwidth after call setup. The chip rate for each direction (reverse and forward) is negotiated between the base station and the mobile station over bands 210 and 220. The mobile station selects the maximum chip rate available for each direction wherein the selected rate is supported by the mobile station. The mobile station then sets the selected rate for both directions for bands 230 (asymmetric forward link channel bandwidth) and 240 (asymmetric reverse link channel bandwidth). The negotiation process is accomplished over bands 210 and 220. At the end of negotiation, the mobile station transfers the call from bands 210 and 220 into bands 230 and 240. After the transfer operation, the call is maintained over bands 230 and 240. If the base station supports only a basic chip rate (non-variable), then the call should be maintained over the first band pair 210 and 220.

Figure 5:
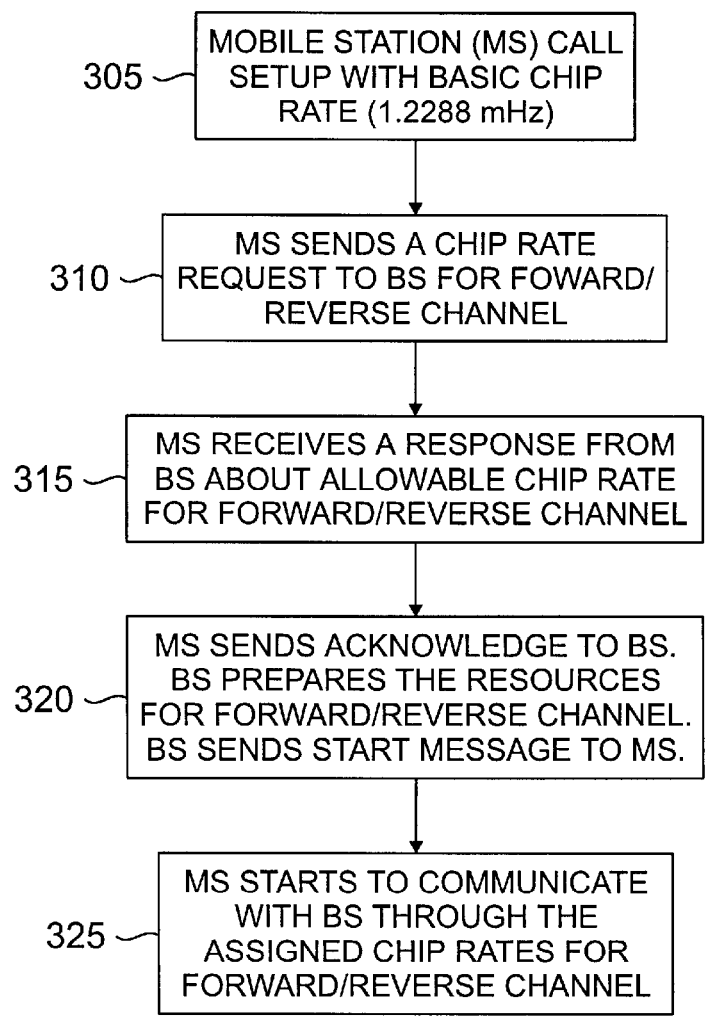
FIG. 5 is a flowchart illustrating a chip rate/bandwidth negotiation process according to the present invention.

Referring to FIG. 5, a flowchart illustrating a chip rate/bandwidth negotiation process according to the present invention will be described. In step 305, the mobile station sets up a call with a basic chip rate, such as 1.2288 MHz. In step 310, the mobile station (MS) sends a chip rate request to the base station (BS) for the forward and reverse channels. In step 315, the MS receives a response from the BS with information about allowable chip rates for the forward and reverse channels. In step 320, the MS sends an acknowledge message to the BS. The BS also prepares the resources for the revised forward and reverse channel chip rates, and sends a start message to the MS. In step 325, the MS starts to communicate with the BS through the newly-assigned chip rates for the forward and reverse channels.

Although the present invention and its advantages have been described in detail, it should be understood that various changes, substitutions and alterations can be made herein without departing from the spirit or scope of the invention as defined in the appended claims.

What is claimed is:

1. A code division multiple access (CDMA) system comprising:
   a base station transmitting forward link data utilizing a forward channel link chip rate and receiving reverse link data utilizing a reverse channel link chip rate; and
   a mobile station transmitting the reverse link data by using the reverse channel link chip rate and receiving the forward link data by using the forward channel link chip rate, wherein the forward channel link chip rate is asymmetrical to the reverse channel link chip rate.

2. The CDMA system set forth in claim 1, wherein said forward channel link chip rate is less than or equal to a maximum forward value allowed by said base station.

3. The CDMA system set forth in claim 1, wherein said reverse channel link chip rate is less than or equal to a maximum reverse value allowed by said base station.

4. The CDMA system set forth in claim 2, wherein said base station transmits the maximum forward value to said mobile station.

5. The CDMA system set forth in claim 3, wherein said base station transmits the maximum reverse value to said mobile station.

6. The CDMA system set forth in claim 1, wherein said forward channel link chip rate is less than or equal to a maximum forward value allowed by said mobile station.

7. The CDMA system set forth in claim 1, wherein said reverse channel link chip rate is less than or equal to a maximum reverse value allowed by said mobile station.

8. The CDMA system set forth in claim 6, wherein said mobile station transmits the maximum forward value to said base station.

9. The CDMA system set forth in claim 7, wherein said mobile station transmits the maximum reverse value to said base station.

10. The CDMA system as set forth in claim 1, wherein the forward channel link chip rate is faster than the reverse channel link chip rate.

11. The CDMA system as set forth in claim 1, wherein the reverse channel link chip rate is faster than the forward channel link chip rate.

12. The CDMA system as set forth in claim 1, wherein both the base station and the mobile station transmit the forward link data and the reverse link data by using a basic chip rate.

13. A method of operating a CDMA system comprising the steps of:
   setting up a call to a base station operating to support a basic chip rate, a maximum forward channel link chip rate, and a maximum reverse channel link chip rate by paging said base station with a mobile station;
   requesting a desired forward channel link chip rate from said base station by said mobile station;
   transmitting said maximum forward channel link chip rate to said mobile station from said base station;
   transmitting a revised forward channel link chip rate to said base station from said mobile station;
   transmitting a start message to said mobile station from said base station; and
   communicating with said base station using said revised forward channel link chip rate.

14. The method of operating a CDMA system as set forth in claim 13 wherein said revised forward channel link chip rate is equal to said basic chip rate.

15. The method of operating a CDMA system as set forth in claim 13 wherein said revised forward channel link chip rate is equal to said maximum forward channel link chip rate.

16. The method of operating a CDMA system as set forth in claim 13, further comprising the steps of:
   requesting a desired reverse channel link chip rate from said base station by said mobile station;
   transmitting said maximum reverse channel link chip rate to said mobile station from said base station;
   transmitting a revised reverse channel link chip rate to said base station from said mobile station; and
   communicating with said base station using said revised reverse channel link chip rate.

17. The method of operating a CDMA system as set forth in claim 16 wherein said revised reverse channel link chip rate is equal to said basic chip rate.

18. The method of operating a CDMA system as set forth in claim 16 wherein said maximum reverse channel link chip rate is equal to said basic chip rate.

19. The method of operating a CDMA system as set forth in claim 16 wherein said basic chip rate is equal to said revised forward channel link chip rate and said revised reverse channel link chip rate.

20. The method of operating a CDMA system as set forth in claim 16 wherein said basic chip rate is equal to said maximum forward channel link chip rate and said maximum reverse channel link chip rate.

21. A method of operating a CDMA system comprising the steps of:

setting up a call to a mobile station operating to support a basic chip rate, a maximum forward channel link chip rate, and a maximum reverse channel link chip rate by paging said mobile station with a base station;

requesting a desired forward channel link chip rate from said mobile station by said base station;

transmitting said maximum forward channel link chip rate to said base station from said mobile station;

transmitting a revised forward channel link chip rate to said mobile station from said base station;

transmitting a start message to said base station from said mobile station; and communicating with said mobile station using said revised forward channel link chip rate.

22. The method of operating a CDMA system as set forth in claim 21 wherein said revised forward channel link chip rate is equal to said basic chip rate.

23. The method of operating a CDMA system as set forth in claim 21 wherein said revised forward channel link chip rate is equal to said maximum forward channel link chip rate.

24. The method of operating a CDMA system as set forth in claim 21, further comprising the steps of:

requesting a desired reverse channel link chip rate from said mobile station by said base station;

transmitting said maximum reverse channel link chip rate to said base station from said mobile station;

transmitting a revised reverse channel link chip rate to said mobile station from said base station; and communicating with said mobile station using said revised reverse channel link chip rate.

25. The method of operating a CDMA system as set forth in claim 24 wherein said revised reverse channel link chip rate is equal to said basic chip rate.

26. The method of operating a CDMA system as set forth in claim 24 wherein said maximum reverse channel link chip rate is equal to said basic chip rate.

27. The method of operating a CDMA system as set forth in claim 24 wherein said basic chip rate is equal to said revised forward channel link chip rate and said reverse channel link chip rate.

28. The method of operating a CDMA system as set forth in claim 24 wherein said basic chip rate is equal to said maximum forward channel link chip rate and said maximum reverse channel link chip rate.

29. A code division multiple access (CDMA) system comprising:

a base station transmitting forward link data by using a forward channel link bandwidth and receiving reverse link data by using a reverse channel link bandwidth; and a mobile station transmitting the reverse link data by using the reverse channel link bandwidth and receiving the forward link data by using the forward channel link bandwidth, wherein the forward channel link bandwidth is asymmetrical to the reverse channel link bandwidth.

30. The CDMA system as set forth in claim 29, wherein the forward channel link bandwidth is broader then the reverse channel link bandwidth.

31. The CDMA system as set forth in claim 29, wherein the reverse channel link bandwidth is broader than the forward channel link bandwidth.

32. The CDMA system as set forth in claim 29, wherein both the base station and the mobile station transmit the forward link data and the reverse link data by utilizing a basic bandwidth.

* * * * *

UNITED STATES PATENT AND TRADEMARK OFFICE
CERTIFICATE OF CORRECTION

PATENT NO.   : 6,320,851 B1
DATED        : November 20, 2001
INVENTOR(S)  : Youngky Kim, Jaemin Ahn and Heewon Kang It is certified that error appears in the above-identified patent and that said Letters Patent is hereby corrected as shown below:

<u>Column 3,</u>
Line 20, "froward" should be -- forward --.

Signed and Sealed this

Fourth Day of June, 2002

Attest:

JAMES E. ROGAN
*Attesting Officer*    *Director of the United States Patent and Trademark Office*